United States Patent Office 3,505,058
Patented Apr. 7, 1970

3,505,058
DITHIOGLUTARIMIDE HERBICIDAL COMPOSITION AND METHOD OF USE
Robert M. Dryden, Media, Pa., assignor to Amchem Products, Inc., Ambler, Pa., a corporation of Delaware
No Drawing. Filed Mar. 12, 1968, Ser. No. 712,341
Int. Cl. A01n 9/22
U.S. Cl. 71—94        3 Claims

ABSTRACT OF THE DISCLOSURE

A herbicidally active composition and method of use comprising 2,6-dithioglutarimide in association with an agricultural carrier.

---

This invention relates to novel herbicidally-active compositions, and is particularly concerned with new compositions containing, as the active ingredient, 2,6-dithioglutarimide.

Herbicides can generally be divided into two classes, namely broad spectrum herbicides (which kill or control all vegetation with which they come in contact) and selective herbicides (which kill or control particular types of vegetation while leaving other types unaffected). Both types of herbicides are of use, but the selective herbicide is particularly valuable when it is desired to kill or control undesirable vegetation—weeds—growing in a crop plant.

I have now discovered that 2,6-dithioglutarimide, a compound of the formula:

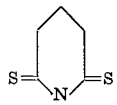

(See Berg and Sandstrom, Acta Chem. Scand. 20, 689–697 (1966)) is such a selective herbicide, particularly against undesirable vegetation growing in small grain crops such as wheat, oats, barley and rye.

In one aspect, therefore, this invention provides a novel herbicidally-active composition comprising 2,6-dithioglutarimide in association with an agricultural carrier therefor.

By the term "agricultural carrier," I mean an inert diluent material employed in admixture with the active ingredient to increase the ease of handling and applying the active ingredient. Suitable carriers for use in connection with the compositions of this invention are mineral and vegetable oils such as heavy aromatic naphtha and pine oil (conveniently employed in the form of an oil/water emulsion with the aid of a conventional emulsifying agent) and clays (employed as granules, pellets or powders) such as attaclay and attapulgate.

Though the exact ratio of active ingredient to inert diluent will naturally depend upon features such as the type of diluent and the amount of composition to be applied per acre, nevertheless, for guidance, I can say that it is convenient to employ from 5% to 20% by weight, especially about 15%, active ingredient in a composition using a liquid diluent which is further diluted, for example with water, 100 times before use (a final active ingredient concentration of from 0.05% to 0.2% by weight). When using a solid diluent, it is more convenient to employ from 5% to 15% by weight, especially about 10%, of active ingredient for direct application without further dilution.

The compositions of this invention, while active against a wide variety of undesirable vegetation, are particularly active against broad-leaf plants, such as pigweed (*Amaranthus retroflexus*), lambsquarter (*Chenopodium album*), yellow rocket (*Barbarea vulgaris*), velvet leaf (*Abutilon threophrasti*), and curled dock (*Rumex crispus*), and are especially active against cheatgrass (*Bromus* spp. like *Bromus secalinus* or *Bromus tectorum*), and blackgrass (*Alopecurus myosuroides*). They also give good control of some aquatic plants, such as duck weed, *Salvinia rotundifolia* and *Eloda canadensis*. They have no effect on small grain crop plants such as wheats, oats, barley and rye and are, therefore, of considerable use in controlling.

The compositions of the present invention may be prepared in accordance with the teachings of the Berg and Sandstrom publication specified hereinabove.

Accordingly, this invention also provides, in another aspect, a method for controlling the growth of undesirable vegetation, which comprises applying to the locus of the vegetation to be controlled a quantity of a composition as described and claimed herein, containing sufficient active ingredient to produce the desired control.

The quantity of composition employed to combat undesirable vegetation naturally depends on the type of vegetation being controlled, on the type of carrier being employed, and on whether the composition is used pre- or post-emergence. I have found that the compositions of this invention can be applied post-emergence of pre-emergence, but are best applied by pre-emergence incorporation.

By post-emergence, I mean that the compositions are applied to the undesired plant after it has grown through and above the soil surface. By pre-emergence, I mean that the compositions are applied to the soil prior to the time the undesired plant has grown through and above the soil surface, although the economic crop may or may not have grown through.

By the term pre-emergence incorporation, I mean that the compositions are actually mixed into the top two or three inches of soil, for example, by discing or harrowing, before the crop is sown. In this way, maximum contact is achieved with weed seeds or roots. For further guidance, I have found that the compositions of this invention give nearly total control against cheatgrass and Alopecurus when the active ingredient is applied to the area to be treated, by pre-emergence incorporation, at a rate of from 1 to 8 lbs./acre, particularly from 2 to 4 lbs./acre. At a rate of 1 lb./acre, there is some controlling effect noticeable—about 50% control can be observed. At the rate of 8 lbs./acre, there is total control and, in order to avoid any possibility of crop damage, as well as for economic reasons, there is little point in using more than 8 lbs./acre.

The agricultural carrier utilized in association with 2,6-dithioglutarimide is an inert material preferably being a mineral or vegetable oil or a clay. Also, mixtures of mineral and vegetable oils are used as set forth in the accompanying examples. In any event, where the agricultural carrier is an oil, the 2,6-dithioglutarimide is present in an amount from 5 to 20% by weight, whereas when the agricultural carrier is a clay, the active ingredient is present from 5 to 15% by weight.

Against broad-leaf plants, however, I have found that post-emergence application is most effective, and that suitable application rates are from 2 to 10 lbs./acre, particularly 8 lbs./acre.

Against aquatic plants, I have found that suitable application rates are from 5 to 20 p.p.m., particulary 10 p.p.m.

The following examples are now given, though only by way of illustration, to demonstrate preferred techniques and compositions according to this invention. All parts and percentages are by weight.

EXAMPLE I

An oil solution 2,6-dithioglutarimide was made up having the following composition:

| | Percent |
|---|---|
| 2,6-dithioglutarimide (62% active) | 16.2 |
| Mineral oil (heavy aromatic naptha) | 26.7 |
| Vegetable oil (pine oil—Yarmer F.) | 27.0 |
| Emulsification agent (a phosphate ester-gafar R.M. 710) | 4.0 |
| Co-solvent (butyl Cellosolve) | 26.1 |

An emulsion was made up using 1 part of the oil solution to 100 parts of water. The emulsion, which formed easily on admixture with stirring, and was satisfactorily stable, contained 0.16% of 62% active 2,6-dithioglutarimide.

This was applied at various rates to an area of land infested with cheatgrass, using standard spray apparatus, and the treated land was lightly tilled afterwards to spread the composition throughout the top 2 or 3 inches of soil.

A statistical evaluation of the resultant crop (oats) and the amount of cheatgrass surviving, gave the following results:

TABLE I

| Lbs./acre of 2,6-dithio-glutarimide | Cheat-grass Control | Damage to Crop |
|---|---|---|
| Control—0 | | |
| 1 | 4 | None. |
| 2 | 7.5 | Do. |
| 3 | 9 | Do. |
| 4 | 10 | Do. |
| 5 | 10 | Do. |
| 6 | 10 | Do. |

Each is the average of 5 separate plots. The scoring method in this and the following tables is 0=no control, 10=100% control (i.e., total kill).

Similar results were obtained against cheatgrass in wheat and rye, and against blackgrass in wheat and barley.

EXAMPLE II

A wettable-powder composition was formed by intimately mixing the following ingredients:

| | Percent |
|---|---|
| 2,6-dithioglutarimide (62% active) | 16.2 |
| Dispersing agent (a sodium lignin sulphonate-Marasperse N) | 2.0 |
| Dispersing agent (a sodium alkyl napthalene sulphonate-Nekal Bx. 78) | 1.0 |
| Attaclay | 80.8 |

The mixture was well blended and then air milled to produce a powder composition having an average particle size of 5 microns and a 10% concentration of active ingredient.

The foregoing composition is set forth as a further example of a composition which has yielded the excellent results of the present invention.

EXAMPLE III

A granular composition was prepared from the following ingredients:

| | Percent |
|---|---|
| 2,6-dithioglutarimide (62% active) | 16.2 |
| Acetone (to dissolve active ingredient) | |
| Attapulgate, 25/50 alum | 83.8 |

The 2,6-dithioglutarimide was dissolved in the minimum quantity of acetone, and the resultant solution was sprayed, by conventional means, onto tumbling attapulgate particles so as to give an even impregnation. After evaporation of the acetone, a 10% active ingredient granular composition was obtained.

The 10% attapulgate granular formulation of 2,6-dithioglutarimide was applied to an area of land infested with blackgrass at various rates. The material was mechanically incorporated into the top 2 inches of the soil with a rotovator, and the area then planted to wheat. An evaluation of this test gave the following results:

TABLE III

| Lbs./acre of active ingredient | Black-grass Control | Damage to Wheat |
|---|---|---|
| Control—0 | 0 | None. |
| 1 | 4.5 | Do. |
| 2 | 8 | Do. |
| 3 | 9 | Do. |
| 4 | 9.5 | Do. |
| 6 | 10 | Do. |
| 8 | 10 | Do. |

EXAMPLE IV

To an area infested with velvet leaf (*Abutilon theophrasti*), curled dock (*Rumex crispus*), pigweed (*Amaranthus retroflexus*), yellow rocket (*Barbarea vulgaris*), and lambsquarter (*Chenopodium album*), all of said weeds being in a 2 to 4 leaf stage of growth, was applied an acetone solution of 2,6-dithioglutarimide as a post-emergence spray application at a rate of 8 lbs./acre. This area had been planted to barley. An examination of the test area three weeks after application showed the following results:

TABLE IV

| Test species: | Control |
|---|---|
| Barley | 0 |
| Velvet leaf | 9 |
| Curled dock | 10 |
| Pigweed | 9.5 |
| Yellow rocket | 9 |
| Lambsquarter | 10 |

EXAMPLE V

To demonstrate the aquatic herbicide activity of 2,6-dithioglutarimide, the following test was run. A one-gallon glass jar containing the floating aquatic species of duckweed (*Lemna minor*) and water fern (*Salvinia rotundifolia*) and the submerged aquatic species *Elodea canodensis*, was injected with ethanol solution of the test material to give a final concentration within the jar of 10 p.p.m. Examination of the plants three weeks later gave the following results:

TABLE V

| Test species: | Control |
|---|---|
| Duckweed | 10 |
| *Salvinia rotundifolia* | 10 |
| *Elodia canodensis* | 10 |

EXAMPLE VI

Table VI shows a different series of test results concerning the effect of 2,6-dithioglutarimide on various weeds and crops at different rates and different crop/weed times:

TABLE VI

| | Pre-emergence, lbs./acre | | | | | | | | Pre-emergence/ Incorporated, lbs./acre | | | | | | | Post-emergence, lbs./acre |
|---|---|---|---|---|---|---|---|---|---|---|---|---|---|---|---|---|
| | ½ | 1 | 2 | 3 | 4 | 6 | 8 | 16 | ½ | 1 | 2 | 3 | 4 | 6 | 8 | 8 |
| Alfalfa | | | | | | | 0 | | | | | | | | 0 | 6 |
| Corn | | | | | | | 0 | | | | | | | | 1 | 2 |
| Soybeans | | | | | | | 3 | | | | | | | | 2 | 5 |
| Wheat | 1 | 1 | 1 | 1 | 1 | 1 | 1 | | 0 | 0 | 0 | 0 | 0 | 0 | 4 | |
| Barley | 0 | 0 | 0 | 1 | 0 | 0 | 0 | | 0 | 0 | 1 | 0 | 1 | 2 | 2 | |
| Cheatgrass | 2 | 1 | 1 | 1 | 1 | 2 | 1 | 10 | 0 | 3 | 8 | 9 | 9 | 9 | 10 | 1 |
| Blackgrass | 2 | 1 | 1 | 1 | 1 | 2 | 1 | | | | 9 | 9 | 8 | 9 | | |
| Yellow Rocket | | | | | | | 9 | | | | | | | | 9 | 3 |
| Chickweed | | | | | | | 9 | | | | | | | | 4 | 5 |
| Pigweed | | | | | | | 0 | | | | | | | | 1 | 9 |
| Lambs-quarter | | | | | | | 0 | | | | | | | | 1 | 10 |

Without further elaboration, the foregoing will so fully illustrate my invention that others may by applying current or future knowledge readily adapt the same for use under various conditions of service.

What is claimed as the invention is:

1. A method of herbicidally controlling undesirable vegetation which comprises applying to the locus of the vegetation to be controlled a quantity of 2,6-dithioglutarimide sufficient to produce the desired control.

2. The method of claim 1, in which the undesirable vegetation is cheatgrass and blackgrass, and the 2,6-dithioglutarimide is applied to the area to be treated, by preemergence incorporation, at a rate of from 1 to 8 lbs./acre.

3. The method of claim 2, in which the 2,6-dithioglutarimide is applied at a rate of from 2 to 4 lbs./acre.

References Cited

Berg et al.: "Electronic Spectra of Thioamides and Thiohydrazides, VIII. Five and Six-Membered Thiolactams and Thioimides," chem. abstracts, vol. 65 (1966), 7025g.

LEWIS GOTTS, Primary Examiner

C. L. MILLS, Assistant Examiner

U.S. Cl. X.R.

260—293.4